UNITED STATES PATENT OFFICE.

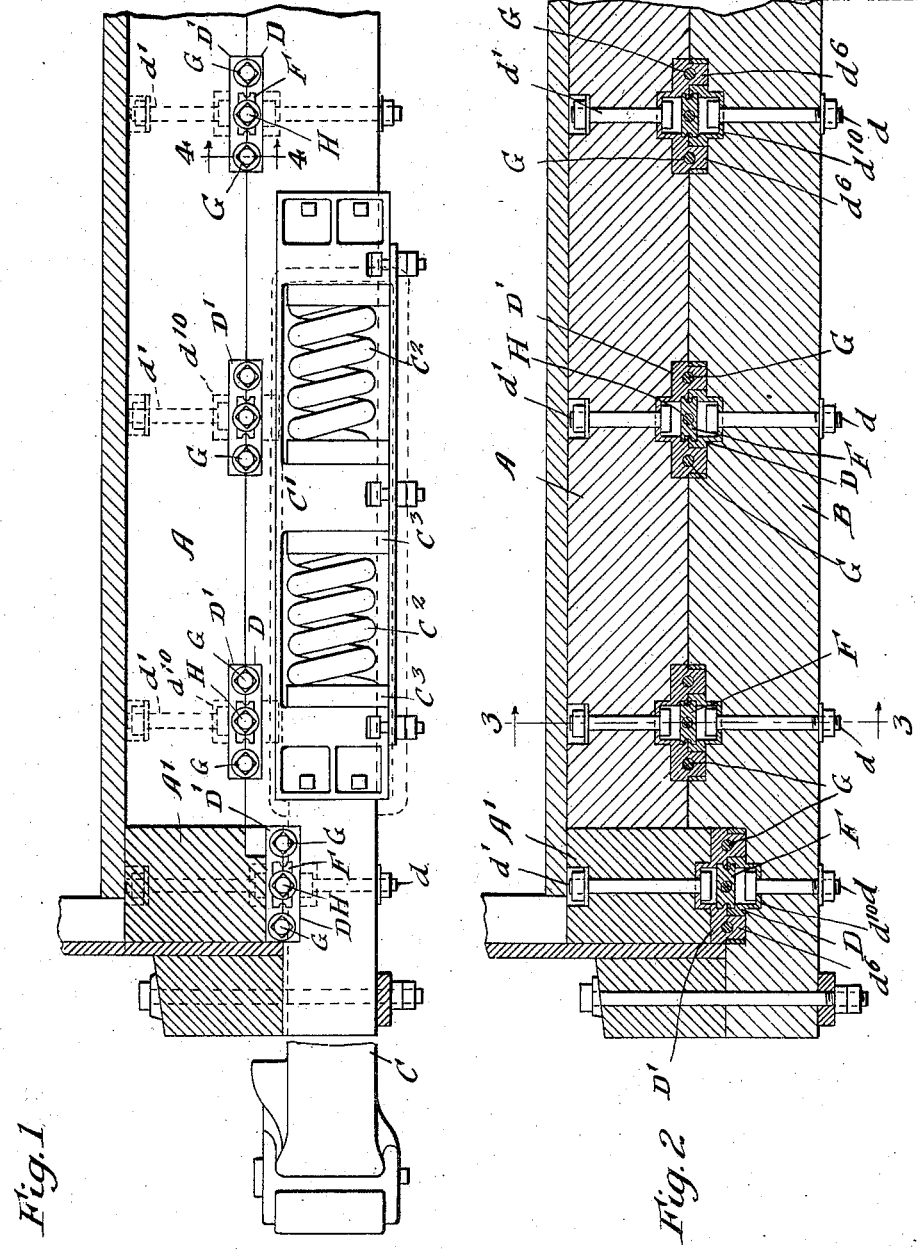

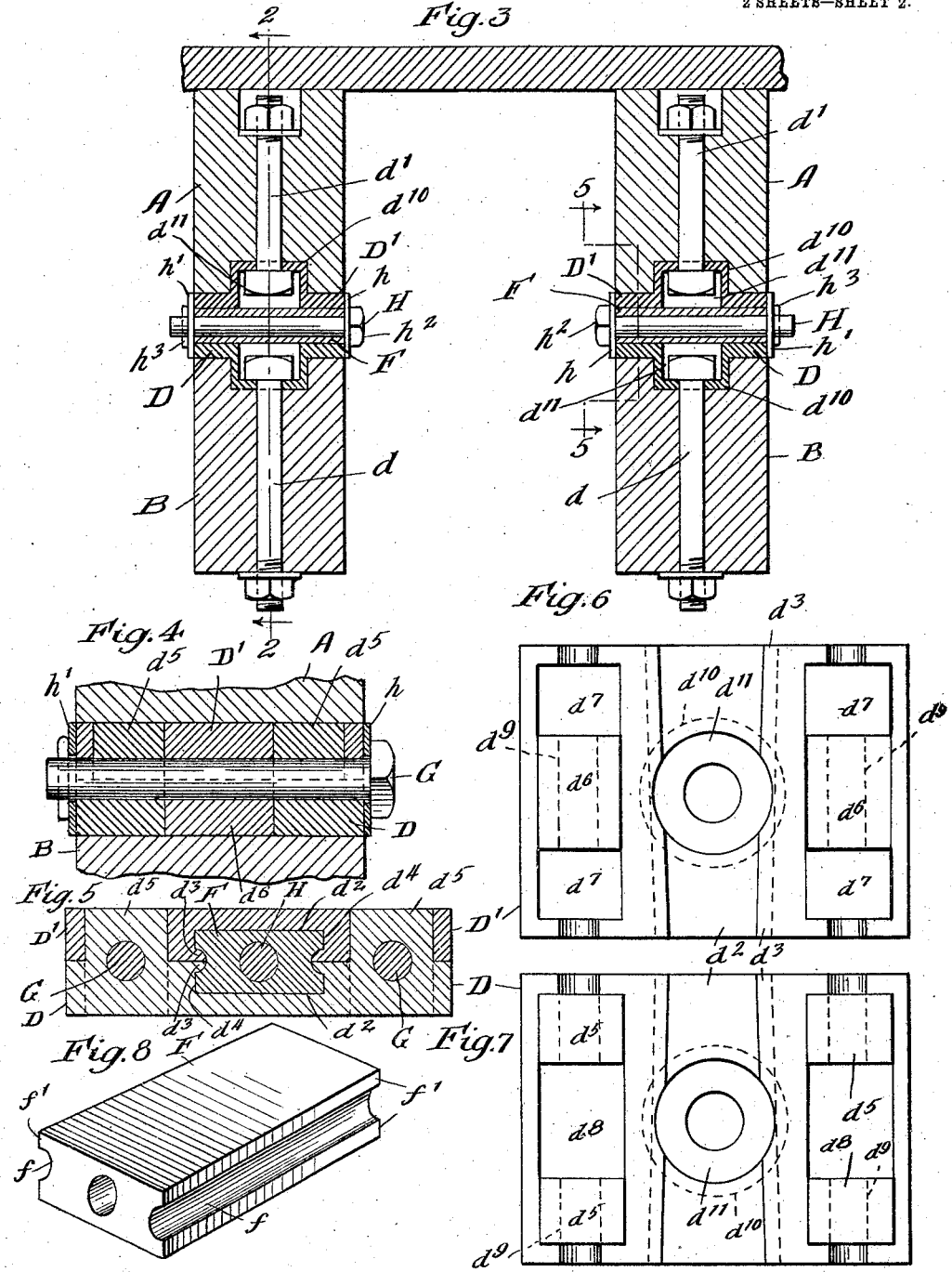

WILLIAM HUNTER EMERICK, OF OSAWATOMIE, KANSAS, AND PETER ALQUIST, OF MEMPHIS, TENNESSEE.

CAR-FRAME.

No. 851,228.     Specification of Letters Patent.     Patented April 23, 1907.

Application filed November 12, 1906. Serial No. 343,028.

*To all whom it may concern:*

Be it known that we, WILLIAM HUNTER EMERICK, a citizen of the United States, residing at Osawatomie, in the county of Miami and State of Kansas, and PETER ALQUIST, a citizen of the United States, residing at Memphis, in the county of Shelby and State of Tennessee, have invented a new and useful Improvement in Car-Frames, of which the following is a specification.

Our invention relates to improvements in car frames, and more particularly to means for removably connecting draft timbers or other parts to the center sills or other members of the car frame work, and our present invention is an improvement upon the inventions forming the subject matter of our previous patents 795,593 of July 25, 1905 and 819,048 of May 1st 1906.

The object of our present invention is to provide a simple, strong, efficient and durable means for removably connecting draft timbers and center sills, or other parts or members of the car frame work, by means of which such parts may be very rigidly connected together and at the same time the one readily removed from the other.

Our invention consists, in connection with center sills, end sill and draft timbers, or other parts of a car frame work to be connected, and dovetail connecting plates secured respectively to the frame members to be connected, and the removable dovetail connecting key, in providing the connecting plates on their meeting faces with interfitting connecting lugs and recesses, the lugs on the one plate alternating or meshing with those on the other, and connecting bolts extending through the lugs, thus additionally locking and securing the connecting plates together both against separating strains and against slipping or shearing strains.

It further consists in providing the connecting plates with a tapering dovetail groove in connection with a tapering or wedging dovetail key, so that the driving or forcing of the dovetail key to place will exert a drawing action and lock the plates very rigidly and firmly together.

It further consists, in connection with the above mentioned parts, in making the meeting dovetail lips on the connecting plates each of a curved or substantially quadrant of a circle form in cross section and the dovetail groove in the key of a curved or substantially semi-circular form in cross section, to further increase the strength and rigidity of the connection.

Our invention further consists in the novel construction of parts and devices and in the novel combinations of parts and devices herein shown or described.

In the accompanying drawing, forming a part of this specification, Figure 1 is a side elevation, partly in vertical section, showing a portion of a car frame to which our invention is applied. Fig. 2 is a vertical longitudinal section taken on line 2—2 of Fig. 3. Fig. 3 is a vertical cross section on line 3—3 of Fig. 2. Fig. 4 is a detail vertical section on line 4—4 of Fig. 1. Fig. 5 is a detail vertical section on line 5—5 of Fig. 3. Fig. 6 is a reverse plan view of the upper connecting plate. Fig. 7 is a plan view of the lower connecting plate, and Fig. 8 is a detail perspective view of the removable dovetail connecting key.

In the drawing we have illustrated our invention as applied or used for removably connecting the draft timbers of a railway car to the center sills and end sill thereof. It will, however, be understood by those skilled in the art, that it may be used for removably connecting other members or parts together.

In the drawing, A $A^1$ and B represent the parts or members to be removably connected. In the instance illustrated in the drawing, the members A are the center sills of the car frame, the member $A^1$ the end sill and the member B the draft timber.

C represents the draw bar, $C^1$ the side plates or stop castings secured to the draft timbers, $C^2$ the draft rigging springs and $C^3$ the followers, these parts being all of any ordinary or desired construction.

D $D^1$ are the lower and upper connecting plates, the connecting plate D being rigidly secured by a bolt $d$ to the draft timber or member B, and the plate $D^1$ by bolt $d^1$ to the center sill or member A, or end sill or member $A^1$.

The connecting plates D $D^1$ are furnished on their meeting faces with registering dovetail channels $d^2$ to receive a removable dovetail key F. The dovetail plates D $D^1$ preferably having dovetail lips $d^3$ which are of curved or quadrant of a circle-shape in cross section, so that the two meeting lips $d^3$ $d^3$ of the two plates D D¹, together, form a semi-circular bead. The removable dovetail key F is preferably provided on its edges with dovetail grooves $f$ $f$, which are semi-circular in cross section and snugly fit and clamp together the curved or quadrant-shaped dovetail lips $d^3$ on the two meeting plates D D¹. The dovetail lips $f^1$ $f^1$ of the double dovetail key F fit in the dovetail grooves $d^4$ at the side edges of the dovetail channel $d^2$ of the plates D D¹. The removable double dovetail key F is preferably of a slightly tapering or wedging form, and the dovetail channels $d^2$ in the plates D D¹ are of corresponding tapering or wedging shape, as will be readily understood from Figs. 6, 7 and 8 of the drawings, so that when the dovetail key is forced or driven into place, it will exert a drawing action upon the plates D D¹ and fit very tightly and snugly in the dovetail channels of the two plates, and thus form a rigid and firm connection.

The connecting plates D D¹ are further provided with interlocking or interfitting lugs $d^5$ $d^5$ $d^5$ $d^5$ and $d^6$ $d^6$, and corresponding recesses or mortices $d^7$ $d^7$ $d^7$ $d^7$ and $d^8$ $d^8$, the lugs on the one plate alternating with those on the other, and the lugs on the one plate extending through the other plate in the mortices or recesses therein. The interfitting lugs on the two plates thus together solidly fill the thickness of the plates, as will be readily understood from the cross sectional views Figs. 4 and 5, which are taken at right angles to each other. To cause these interfitting, interlocking or intermeshing lugs on the meeting faces of the two plates to serve not only as a means for connecting the plates together against slipping movements or strains in the plane of the plates, but also as a means for connecting the plates together against separation or pulling apart of the plates, we provide the interfitting lugs $d^5$ $d^6$ with registering bolt holes $d^9$, and insert bolts G through said lugs, thus affording an additional connection between the plates of great strength and rigidity.

To lock the removable double dovetail connecting key F in place, we furnish the same with a bolt H, having washers $h$ $h^1$ which bear against the edges of the dovetail connecting plates D D¹, and thus prevent displacement of the key F. The bolt H has a head $h^2$, and preferably a split key $h^3$.

Each of the connecting plates D D¹ is preferably furnished on its outer face with a circular hub or boss $d^{10}$, fitting in a suitable recess in the frame member or part with which it is connected, and having a hollow chamber or recess $d^{11}$ to receive the head of the bolt by which the connecting plate is secured to its frame member. This boss or hub serves as an additional anchorage for the connecting plate to the frame member.

We claim:

1. In a car frame, the combination with the center sill, end sill and draft timbers, of dovetail connecting plates secured to said sills and draft timbers respectively, said connecting plates being provided on their meeting faces with dovetail channels, a removable double dovetail key fitting in the dovetail channels of the connecting plates, said connecting plates also having on their meeting faces interfitting lugs, and connecting bolts extending through said interfitting lugs for additionally connecting said plates together, substantially as specified.

2. The combination with two members to be removably connected, of a pair of connecting plates secured to said members respectively and provided on their meeting faces with registering dovetail channels and interfitting lugs, a removable dovetail key fitting in the dovetail channels of said plates, and connecting bolts extending through said interfitting lugs, substantially as specified.

3. The combination with two members to be removably connected, of a pair of connecting plates secured to said members respectively, and provided on their meeting faces with two sets of interfitting lugs, and connecting bolts extending through said lugs for removably connecting said plates together, substantially as specified.

4. The combination with two members to be removably connected, of a pair of connecting plates secured to said members respectively, and provided on their meeting faces with two sets of interfitting lugs, and connecting bolts extending through said lugs for removably connecting said plates together, said connecting plates having also on their meeting faces tapering or wedging dovetail channels and a removable tapering or wedging dovetail key, substantially as specified.

5. The combination with two members to be connected, of connecting plates secured thereto respectively, and provided on their meeting faces with interfitting lugs and mortices or recesses, and a connecting bolt extending through said lugs, substantially as specified.

6. The combination with two members to be removably connected, of a pair of connecting plates secured to said members respectively, and both provided with dovetail channels on their meeting faces, having curved or quadrant-shaped dovetail lips, and a dovetail key having semi-circular grooves in its edges, substantially as specified.

7. The combination with two members to be removably connected, of a pair of connecting plates secured to said members respectively, and furnished on their meeting faces with tapering or wedging dovetail channels, of a removably tapering or wedging double dovetail key, substantially as specified.

8. The combination with two members to be removably connected, of a pair of connecting plates secured to said members respectively, and both provided with dovetail channels on their meeting faces, having curved or quadrant-shaped dovetail lips, and a double dovetail key having semi-circular grooves in its edges, said connecting plates having on their meeting faces interfitting lugs and mortices or recesses, and a connecting bolt extending through said lugs, substantially as specified.

9. The combination with two members to be removably connected, of a pair of connecting plates secured to said members respectively, and furnished on their meeting faces with tapering or wedging dovetail channels, of a removable tapering or wedging double dovetail key, said connecting plates having on their meeting faces interfitting lugs and mortices or recesses, and a connecting bolt extending through said lugs, substantially as specified.

10. The combination with two members to be removably connected, of a pair of connecting plates secured to said members respectively, and provided with tapering or wedging dovetail channels on their meeting faces, having curved or quadrant-shaped dovetail lips, and a tapering or wedging dovetail key having semi-circular grooves in its edges, substantially as specified.

WILLIAM HUNTER EMERICK.
PETER ALQUIST.

Witnesses to the signature of William Hunter Emerick:
 H. A. BUNDY,
 J. O. GRIMES.

Witnesses to the signature of Peter Alquist:
 N. A. ALQUIST,
 J. A. MOORE.